US007830756B2

United States Patent
Yoshimoto

(10) Patent No.: US 7,830,756 B2
(45) Date of Patent: Nov. 9, 2010

(54) DEMODULATION OF TRACKING ERROR SIGNAL TO OBTAIN LENS POSITION FOR LENS MOTION CONTROL IN AN OPTICAL DISC SYSTEM

(75) Inventor: Ainobu Yoshimoto, Milpitas, CA (US)

(73) Assignee: LSI Corporation, Milpitas, CA (US)

( * ) Notice: Subject to any disclaimer, the term of this patent is extended or adjusted under 35 U.S.C. 154(b) by 1754 days.

(21) Appl. No.: 10/936,017

(22) Filed: Sep. 8, 2004

(65) Prior Publication Data

US 2006/0062105 A1    Mar. 23, 2006

(51) Int. Cl.
*G11B 7/00* (2006.01)
(52) U.S. Cl. .............. 369/44.28; 369/30.13; 369/47.55; 369/53.23; 369/44.27
(58) Field of Classification Search .............. 369/44.11, 369/47.17, 53.15, 44.32, 44.26, 44.29, 44.35, 369/30.1, 53.23, 44.25, 44.27, 44.28, 44.34, 369/44.41, 53.13, 59.21, 53.28, 53.35, 47.1, 369/47.55, 53.1, 53.17
See application file for complete search history.

(56) References Cited

U.S. PATENT DOCUMENTS

| 5,446,708 | A | * | 8/1995 | Takebayashi et al. ...... 369/30.1 |
| 6,064,638 | A | * | 5/2000 | Graba ...................... 369/44.28 |
| 6,167,011 | A | * | 12/2000 | Sun et al. ................. 369/44.41 |
| 6,396,780 | B1 | * | 5/2002 | Nakabori et al. ......... 369/44.37 |
| 6,876,613 | B2 | * | 4/2005 | Byun et al. .............. 369/53.15 |
| 2003/0031103 | A1 | * | 2/2003 | Kuribayashi et al. ..... 369/47.17 |

* cited by examiner

*Primary Examiner*—William J Klimowicz
*Assistant Examiner*—Kim-Kwok Chu
(74) *Attorney, Agent, or Firm*—Christopher P. Maiorana, PC

(57) ABSTRACT

A method for demodulating a tracking error signal comprising the steps of (A) demodulating the tracking error signal when starting motion, (B) demodulating the tracking error signal after motion has started, and (C) demodulating the tracking error signal before and after lens motion stops.

20 Claims, 4 Drawing Sheets

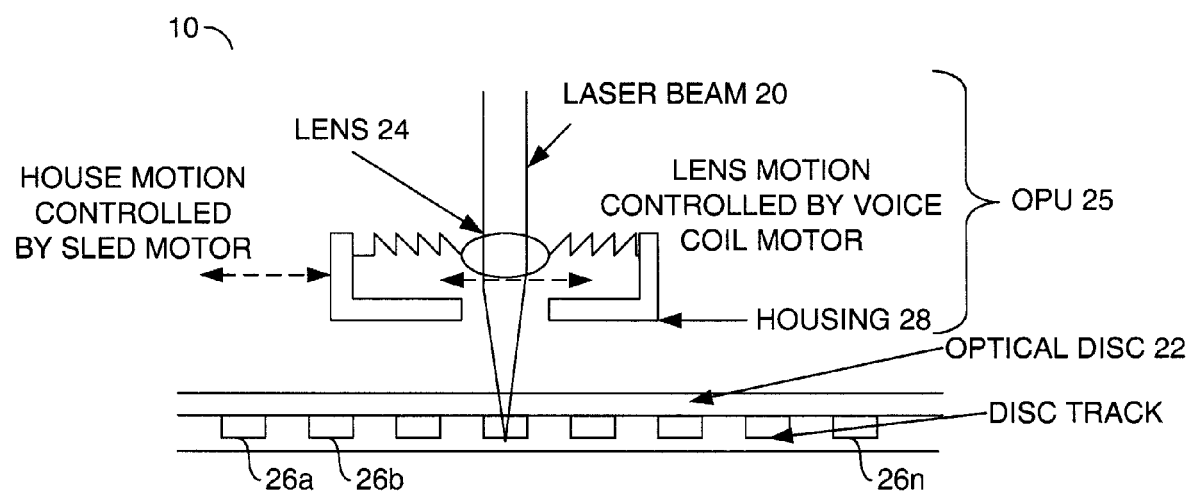
(CONVENTIONAL)
FIG. 1

DEMODULATION OF TRACKING ERROR SIGNAL TO OBTAIN LENS POSITION FOR LENS MOTION CONTROL IN AN OPTICAL DISC SYSTEM

CROSS-REFERENCE TO RELATED APPLICATIONS

The present invention relates to co-pending application Ser. No. 10/915,232, which is hereby incorporated by reference in its entirety.

FIELD OF THE INVENTION

The present invention relates to optical storage generally and, more particularly, to demodulation of a tracking error signal to obtain lens position for lens motion control in an optical disc system.

BACKGROUND OF THE INVENTION

In a conventional optical disc system (i.e., CD or DVD), to move a laser beam from one track to another track of the disc, a tracking actuator is used to move the lens across these tracks. Lens position information during this motion is crucial for motion feedback control to move the lens from a current track position to the target track position.

Referring to FIG. 1, an optical disc system 10 is shown. To control the position of a laser beam 20 on the disc 22, the position of the objective lens 24 of the Optical Pickup Unit (OPU) 25 related to the tracks 26a-26n on the optical disc 22 is controlled by a tracking actuator. The OPU 25 is a device configured to emit a laser beam and pick up the optical reflection of the beam and convert such reflections to electrical signals.

Conventional approaches use a tracking error signal TE along with another signal, often called a ripple signal, to obtain the position of the lens 24 in relation to the tracks 26a-26n of the optical disc 22. The ripple signal is about 90 degrees different (either faster or slower) in phase than the signal TE (depending on the direction the lens 24 moves).

Using another signal beside the signal TE uses more hardware and/or firmware support to create and calibrate this additional ripple signal. In some types of media, the ripple signal is very difficult to obtain and not always reliable. The process of obtaining lens position information becomes more complicated and even not accurate. It is very difficult to create a reliable ripple signal, especially in different types of optical media or in a disc that is partially filled with data and is partially blank. The poor quality of the ripple signal makes the process of obtaining lens position information more complicated and even not accurate. As a result, feedback control for tracking the actuator is also difficult to implement. In a worst case, a poor ripple signal can make the control system unstable and cause a failure in lens motion.

It would be desirable to provide a method and/or apparatus to extract the lens position information using only the tracking error signal (TE) during motion control. It would also be desirable to implement such a system that is simple and allows a closed loop feedback control during movement of a laser beam across the tracks of an optical disc.

SUMMARY OF THE INVENTION

The present invention concerns a method for demodulating a tracking error signal comprising the steps of (A) demodulating the tracking error signal when starting motion, (B) demodulating the tracking error signal after motion has started, and (C) demodulating the tracking error signal before and after lens motion stops.

The objects, features and advantages of the present invention include providing a method and/or apparatus for obtaining lens position in an optical media that may (i) be implemented using only one signal (e.g., TE), (ii) be implemented in firmware at low cost, (iii) be implemented using less hardware and firmware support than conventional approaches, and/or (iv) provide better performance when other calibration signals cannot be reliably created.

BRIEF DESCRIPTION OF THE DRAWINGS

These and other objects, features and advantages of the present invention will be apparent from the following detailed description and the appended claims and drawings in which:

FIG. 1 illustrates a conventional lens and a lens housing;

DETAILED DESCRIPTION OF THE PREFERRED EMBODIMENTS

The present invention provides a method and/or apparatus for demodulating a tracking error signal (e.g., TE) to obtain lens position information during movement of the lens. The signal TE is normally sampled at an appropriate sampling rate to be useful for the demodulation. The sampling rate should be chosen to be fast enough to sample at least 8 samples of the signal TE when a laser beam crosses one track. A calibration of an offset and a gain of the signal TE is needed to center the signal TE at a zero value and to set a peak-to-peak value (Vpp) of the signal TE as a design value.

Figure 2:
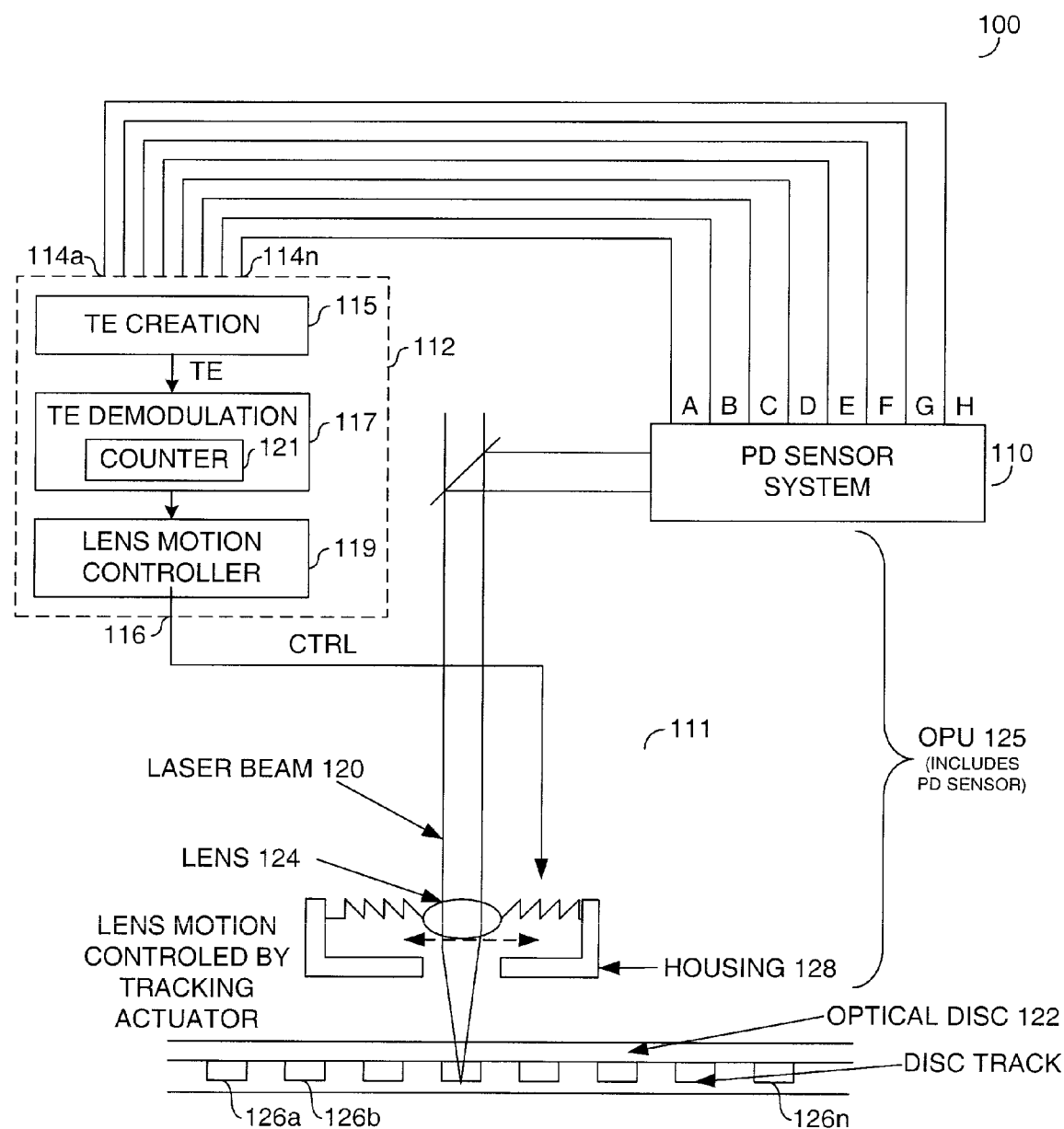
FIG. 2 is a diagram illustrating a context of the present invention.

Referring to FIG. 2, a diagram of a system 100 illustrating the present invention is shown. The system 100 generally comprises a photo-diode sensor block (or circuit) 110, a lens housing portion 111 and a control block (or circuit) 112. The photo-diode sensor block 110 has output signals (or photo-diode signals) A, B, C, D, E, F, G and H that are generally presented to a number of inputs 114a-114n of the control block 112. The control block generally comprises a creation block (or circuit) 115, a demodulation block (or circuit) 117 and a motion controller (or circuit) 119. The creation block 115 may be implemented as a tracking error (TE) creation block. The demodulation block 117 may be implemented as a tracking error (TE) demodulation circuit or as demodulation software. The motion controller 119 may be implemented as a lens motion control circuit or as lens motion control software. The tracking error signal TE is passed through the demodulation block 117 before being passed to the controller block 119. The control block 112 has an output 116 that presents a control signal (e.g., CTRL) that controls a tracking actuator. The lens housing 111 generally comprises a laser pick-up 120, an optical disc 122, a lens 124, an OPU 125 and a housing 128. The optical disc 122 has a number of disc tracks 126a-126n.

Figure 3:
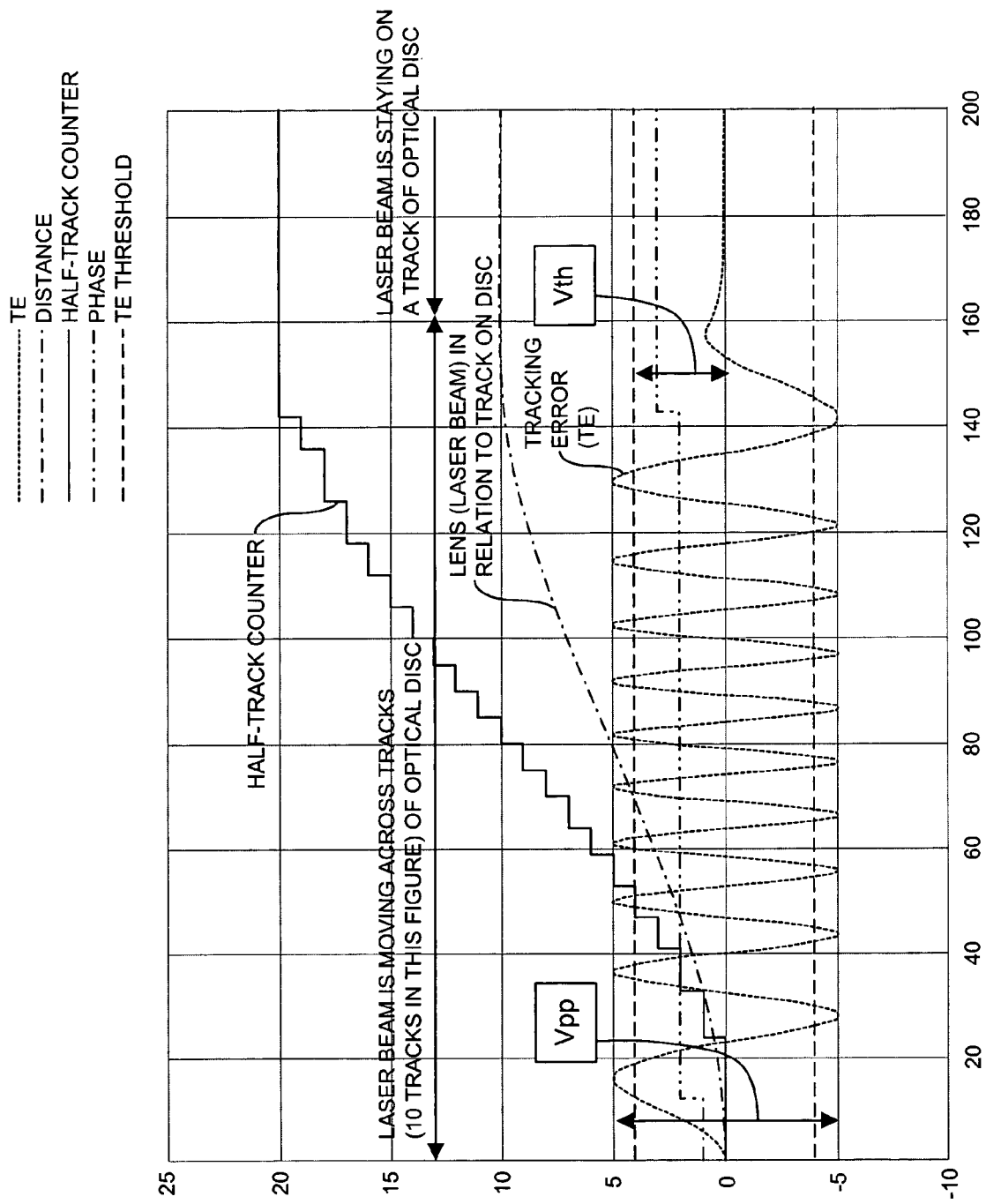
FIG. 3 is a diagram illustrating the peak to peak value of a tracking error signal.

A tracking error signal (e.g., TE) in an optical disc (e.g., a CD, DVD, etc.) is normally created by either a differential phase detecting (DPD) method or a differential push pull (DPP) method. With the DPD method, the difference in phase of the photo-diode signals (e.g., the signals A, B, C and D) from the main laser beam are used to create the signal TE. In the DPP method, the difference in value of the signals A, B, C and D from the main laser beam 120 and the photo-diode signals (e.g., the signals E, F, G and H) from a side laser beam are used to create the signal TE. The signals A, B, C, D, E, F, G and H may be motion signals used by the TE creation block 115 to generate the signal TE. The configuration of the side laser beam often changes from manufacturer to manufacturer. Regardless of how the signal TE is created, as long as the signal TE resembles the signal TE described in FIG. 3, then the present invention is applicable. Either the DPD method or the DPP method detects the position of the laser beam 120 in relation to the tracks 126a-126n on the disc 122. When the laser beam 120 (or the lens 124) stays focused on the same one of the tracks 126a-126n, then the signal TE has a small change in level. When the laser beam 120 is moved across the tracks 126a-126n, then the signal TE has an amplitude that goes up and down. The center level is the level when the laser beam 120 stays on the same tracks 126a-126n. The center level is calibrated to become zero. When the laser beam 120 (or the lens 124) moves from one of the tracks 126a-126n to another adjacent one of the tracks 126a-126n, the signal TE changes. The signal TE will reach a peak (or bottom) level then return to the center level. The signal TE will then reach the bottom (or peak) before returning to the center level again (as shown in FIG. 3).

Figure 4:
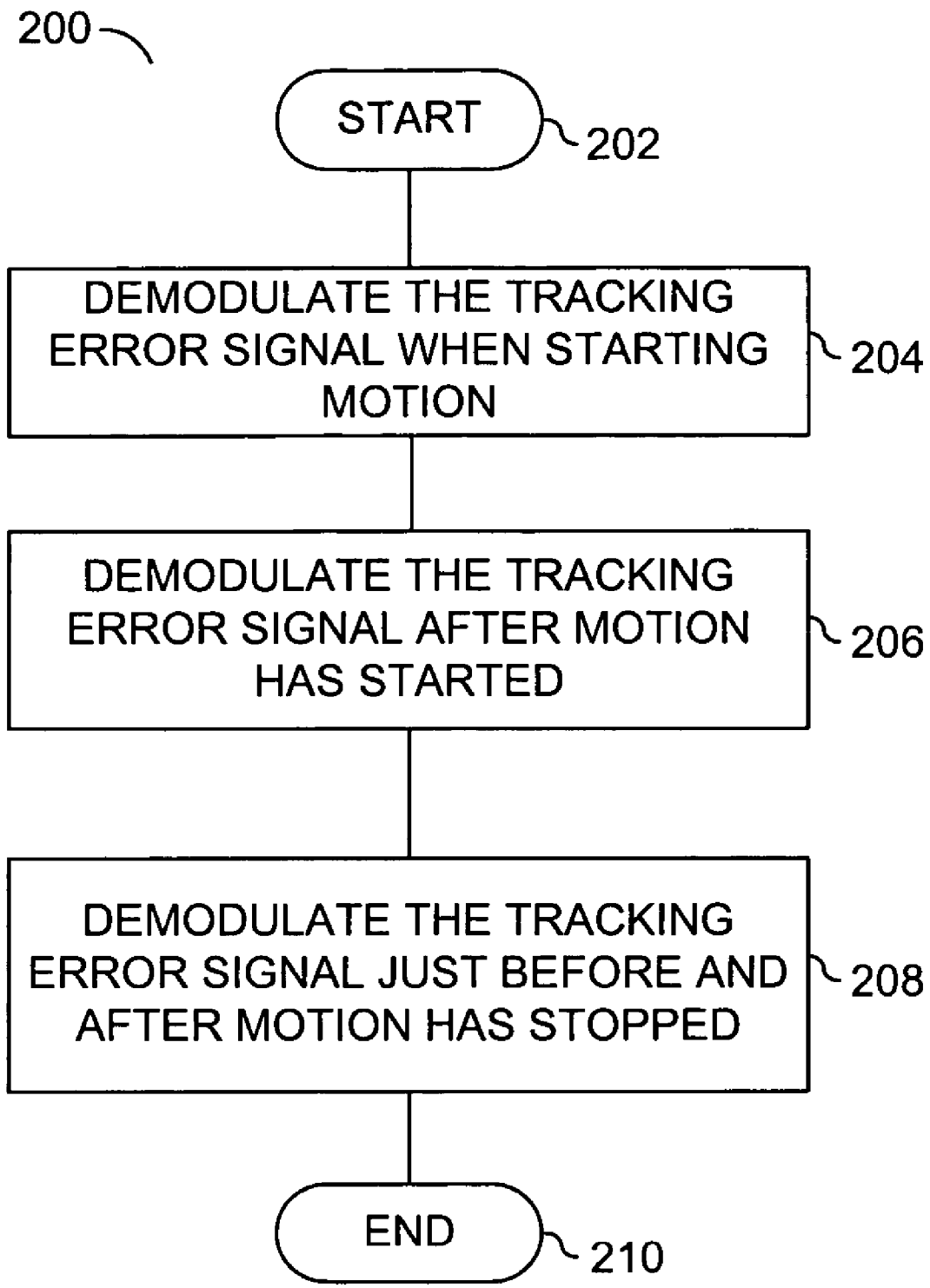
FIG. 4 is a flow diagram of a process used in the present invention.

Referring to FIG. 4, a method 200 is shown in accordance with the present invention. The method 200 is generally implemented in the demodulation block 117. The method 200 generally comprises a start state (or step) 202, a state (or step) 204, a state (or step) 206, a state 208, and an end of state 210. The state 204 demodulates the tracking error signal TE when motion of the lens 124 starts. The state 206 demodulates the tracking error signal TE after motion of the lens 124 has started. The state 208 demodulates the tracking error signal TE just before and after motion of the lens 124 stops. The step 204 may be considered phase 1, or a first phase. The step 206 may be considered phase 2, or a second phase. The step 208 may be considered phase 3, or a third phase.

The state 204 demodulates the signal TE when motion of the lens 124 starts. In the TE demodulation block 117, a counter 121 (e.g., a half-track counter) is generally implemented to count how many half-tracks that the lens 124 has crossed. The state of the half-track counter 121 will be described in connection with the various phases of the method 200. The half-track counter 121 is normally implemented inside the TE demodulation block 117. The half-track counter 121 may be implemented in either hardware or software. The half-track counter 121 is set to zero in the state 204. Two half-tracks of movement will be considered a single track of movement. In the step 204, a TE threshold level (e.g., Vth) which is less than Vpp/2 is defined as a trigger level to detect when the laser beam 120 or the lens 124 starts moving out from a current one of the tracks 126a-126n when the lens being moved (or kicked) by the tracking actuator. In this phase, if the absolute value of the signal TE is less than the level Vth, then the lens position is demodulated from the signal TE as:

Half-track counter is equal to zero in this phase and
Moving Distance=$K*Kd*TE$.

In which,

Kd is either 1 or −1 depending on the direction of the kick of the lens 124. If lens 124 is kicked in the direction so that the signal TE is going to be positive, then Kd=1. Otherwise Kd=−1.

K is a scaling factor used to convert from the units of the signal TE to units of distance measuring movement of the lens 124. Because the direction of the lens-kick from the tracking actuator is known, the Moving Distance defined is a distance value of the lens 124 (or the laser beam 120) motion in relation to tracks 126a-126n on the disc 122 in the kicking direction. When the Moving Distance is positive, the lens 124 (or laser beam 120) is actually moving in the lens-kicking direction by the distance of the Moving Distance value. Depending on the particular application, a user may combine the lens-kicking direction with the Moving Distance to generate an arithmetic value representing the motion. For example, a user may define an Arithmetic Moving Distance as Kd*Moving Distance. Because there are a variety of ways to convert Moving Distance to Arithmetic Moving Distance, the present invention refers generally to the Moving Distance as explained above.

When the tracking actuator starts to move the lens 124 (and if the absolute value of the signal TE is equal or more than Vth value), then the lens kick is considered successful and the demodulation of the signal TE moves to the step 206.

The step 206 demodulates the signal TE after the lens 124 has started motion. The demodulation of the signal TE is based on the new value of the signal TE from the new sampling time and the previous value of the signal TE from the previous sampling time. There are 2 demodulation cases.

In the first case, if the new value of the signal TE and the previous value of the signal TE have the same sign, then the demodulation is as follows:

Moving Distance=Previous Moving Distance+K*(absolute value of the difference between new signal TE and previous signal TE). The half-track counter remains unchanged in this case.

In the second demodulation case, if the new value of the signal TE and the previous value of the signal TE have a different sign, then the demodulation is as follows:

Half-Track counter will be increased by one. Moving Distance=Half-Track counter value+K*(absolute value of new signal TE).

To prevent bad effects of noise on the signal TE that may cause a "chattering" in the sign of the signal TE in consecutive sampling time, a "chattering lock" is used. Such a lock will reject the possibility of case 2 happening on consecutive sampling times. In particular, if the case 2 happens again in the next sampling, then the half-track counter will not be increased.

When the position of the lens 124 (as demodulated from the signal TE in phase 2) is closer to the target position than less than a quarter of one track, then the demodulating process goes to Phase 3 where demodulation of the signal TE becomes:

The half-track counter will be increased by one. Moving Distance=Half Track counter value+K*Kd*TE.

This happens until the laser beam 120 completely locks back to the target track and stays on this track. In Phase 3, the control of tracking actuator is used to ensure the signal TE never reaches the peak or bottom level again after it reaches the center level. This condition is checked in this phase by comparing the signal TE with the peak and bottom level or a threshold level near that after TE signal reaches the center level in this phase.

The present invention may be applied to all kinds of CD optical disc (CD-ROM, VCD, CD-R, CD-RW) as well as DVD-ROM, DVD-R, DVD-RW, DVD+R, and/or DVD+RW).

The function performed by the flow diagram of FIG. 4 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for obtaining a lens position of a lens in an optical disc system comprising the steps of:
   (A) generating a tracking error signal in response to a plurality of motion signals from an optical pickup unit of said optical disc system;
   (B) obtaining said lens position by demodulation from only the tracking error signal when starting motion of said lens by a tracking actuator, wherein a counter configured to count a number of half-tracks that said lens has crossed is set to zero and said lens position is determined by scaling an absolute value of the tracking error signal by a predefined scaling factor, wherein said half-tracks is half a distance of two neighboring tracks of an optical recording medium;
   (C) obtaining said lens position by demodulation from only the tracking error signal after motion of said lens has started, wherein a start of said motion is determined by an absolute value of said tracking error signal being greater than or equal to a threshold level and said lens position and a count of said counter are determined based upon a current value of the tracking error signal and a previous value of the tracking error signal; and
   (D) obtaining said lens position by demodulation from only the tracking error signal just before and after lens motion stops when said lens position is close to a target position, wherein said lens position is determined by scaling the tracking error signal by said predefined scaling factor and adjusting said count of said counter based upon the scaled value of the tracking error signal.

2. The method according to claim 1, wherein a sign of said tracking error signal is used to determine a direction of the adjustment of said count to obtain the position of said lens.

3. A non-transitory computer readable medium storing instructions executable by a computer, said instructions configured to cause said computer to execute the steps of claim 1.

4. The method according to claim 3, wherein said non-transitory computer readable medium comprises firmware.

5. The method according to claim 1, wherein said steps are implemented using firmware.

6. The method according to claim 1, wherein said steps are implemented using hardware.

7. The method according to claim 1, wherein said steps are implemented partially using hardware and partially using firmware.

8. The method according to claim 1, wherein said tracking error signal is generated using differential phase detection.

9. The method according to claim 1, wherein said tracking error signal is generated using differential push-pull.

10. The method according to claim 1, wherein said counter is set to zero before motion of said lens is started.

11. The method according to claim 1, wherein said threshold value is defined as a trigger level to detect when said lens moves out from a current track.

12. The method according to claim 1, wherein step (C) further comprises demodulating the tracking error signal when said absolute value of said tracking error signal is equal to said threshold level.

13. The method according to claim 1, wherein the steps B, C and D comprise a first lens position determining phase, a second lens position determining phase and a third lens position determining phase, respectively.

14. The method according to claim 13, further comprising:
   moving from the first phase to the second phase in response to the tracking error signal having an absolute value equal to or greater than said threshold;
   moving from the second phase to the third phase in response to the lens position demodulated from the tracking error signal being less than a quarter track from a target track.

15. The method according to claim 1, wherein step C further comprises:
   when said current value of the tracking signal and the previous value of the tracking signal have the same sign, determining said lens position comprises scaling the absolute value of a difference between the current value of the tracking error signal and the previous value of the tracking signal by the predefined scaling factor and adding a previous moving distance; and
   when said current value of the tracking signal and the previous value of the tracking signal have different signs, determining said lens position comprises scaling the absolute value of the tracking error signal by the predefined scaling factor, increasing the count of the counter by one and adding the scaled absolute value of the tracking error signal and a current count of the counter.

16. An apparatus for obtaining a lens position in an optical disc system comprising:
   means for generating a tracking error signal in response to a plurality of motion signals from an optical pickup unit of said optical disc system;
   means for obtaining said lens position by demodulation from only the tracking error signal when starting motion of said lens by a tracking actuator, wherein a counter configured to count a number of half-tracks that said lens has crossed is set to zero and said lens position is determined by scaling an absolute value of the tracking error signal by a predefined scaling factor, wherein said half-tracks is half a distance of two neighboring tracks of an optical recording medium;
   means for obtaining said lens position by demodulation from only the tracking error signal after motion of said lens has started, wherein a start of said motion is determined by an absolute value of said tracking error signal being greater than or equal to a threshold level and said lens position and a count of said counter are determined based upon a current value of the tracking error signal and a previous value of the tracking error signal; and means for obtaining said lens position by demodulation from only the tracking error signal just before and just after lens motion stops when said lens position is close to a target position, wherein said lens position is determined by scaling the tracking error signal by said predefined scaling factor and adjusting said count of said counter based upon the scaled value of the tracking error signal.

17. An apparatus for controlling an optical disc comprising:
- a sensor configured to generate a plurality of motion signals in response to a laser of said optical disc;
- a control circuit configured to generate a control signal in response to said plurality of motion signals; and
- a tracking actuator configured to adjust a position of an optical housing in response to said control signal, wherein said control signal is generated by (i) obtaining a lens position by demodulation from only a tracking error signal when starting motion of a lens by said tracking actuator, wherein a counter configured to count a number of half-tracks that said lens has crossed is set to zero and said lens position is determined by scaling an absolute value of the tracking error signal by a predefined scaling factor, (ii) obtaining said lens position by demodulation from only the tracking error signal after a motion of said lens has started, wherein a start of said motion is determined by an absolute value of said tracking error signal being greater than or equal to a threshold level and said lens position and a count of said counter are determined based upon a current value of the tracking error signal and a previous value of the tracking error signal, and (iii) obtaining said lens position by demodulation from only the tracking error signal just before and after lens motion stops when said lens position is close to a target position, wherein said lens position is determined by scaling the tracking error signal by said predefined scaling factor and adjusting said count of said counter based upon the scaled value of the tracking error signal, wherein said half-tracks is half a distance of two neighboring tracks of an optical recording medium.

18. The apparatus according to claim 17, wherein said control circuit demodulates a tracking error signal to generate said control signal.

19. The apparatus according to claim 18, wherein said control circuit comprises:
- a creation circuit configured to generate said tracking error signal in response to said motion signals;
- a demodulation circuit configured to demodulate said tracking error signal; and
- a motion controller circuit configured to generate said control signal in response to said demodulated tracking error signal.

20. The apparatus according to claim 17, wherein said plurality of motion signals comprise a first set of signals generated by a main laser beam and a second set of signals generated by a side laser beam.

* * * * *